(12) United States Patent
Mitamura

(10) Patent No.: US 11,368,596 B2
(45) Date of Patent: Jun. 21, 2022

(54) SHEET FEEDING DEVICE AND IMAGE READING APPARATUS

(71) Applicant: CANON KABUSHIKI KAISHA, Tokyo (JP)

(72) Inventor: Akiyuki Mitamura, Ibaraki (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 17/099,813

(22) Filed: Nov. 17, 2020

(65) Prior Publication Data

US 2021/0168259 A1 Jun. 3, 2021

(30) Foreign Application Priority Data

Nov. 28, 2019 (JP) .............................. JP2019-215855

(51) Int. Cl.
| | | |
|---|---|---|
| *H04N 1/028* | (2006.01) | |
| *H04N 1/00* | (2006.01) | |
| *B65H 7/14* | (2006.01) | |
| *B65H 3/06* | (2006.01) | |
| *B65H 1/04* | (2006.01) | |

(52) U.S. Cl.
CPC ........... *H04N 1/02825* (2013.01); *B65H 1/04* (2013.01); *B65H 3/06* (2013.01); *B65H 7/14* (2013.01); *H04N 1/00694* (2013.01); *H04N 1/00824* (2013.01)

(58) Field of Classification Search
CPC ................ B65H 1/04; B65H 2511/417; B65H 2511/51; B65H 2551/21; B65H 2801/06; B65H 2801/39; B65H 3/06; B65H 7/02; B65H 7/14; H04N 1/00694; H04N 1/00824; H04N 1/02825

USPC ......................................... 358/474, 475, 509
See application file for complete search history.

(56) References Cited

U.S. PATENT DOCUMENTS

| | | | | |
|---|---|---|---|---|
| 5,732,307 | A | * | 3/1998 | Yoshizuka ......... G03G 15/6508 271/110 |
| 5,797,080 | A | * | 8/1998 | Okamoto ............... G03G 15/23 271/265.01 |
| 5,801,793 | A | * | 9/1998 | Faris .................... H04N 5/7441 349/5 |
| 7,034,925 | B2 | | 4/2006 | Kamiyama et al. |
| 7,753,355 | B2 | | 7/2010 | Mitamura |
| 8,393,614 | B2 | | 3/2013 | Mitamura |
| 8,752,832 | B2 | | 6/2014 | Mitamura |
| 9,671,528 | B2 | * | 6/2017 | Shimada .............. G02B 5/0231 |
| 10,564,471 | B2 | * | 2/2020 | Mifune ............. G02B 27/0101 |

(Continued)

FOREIGN PATENT DOCUMENTS

JP 2004-299907 A 10/2004

*Primary Examiner* — Negussie Worku
(74) *Attorney, Agent, or Firm* — Venable LLP

(57) ABSTRACT

A sheet feeding device includes a stacking tray for stacking a sheet; a sheet detector for detecting presence/absence of the sheet on the stacking tray; a feeder for feeding the sheet detected by the sheet detector; an LED, provided adjacent to the sheet stacked on the stacking tray, for emitting light; a display, provided substantially in parallel with an optical axis of the LED, for being illuminated by the light emitted from the LED; a reflector, provided opposed to the display portion, for reflecting and scattering the light emitted by the LED, toward the display; and a controller for controlling emission of the light of the LED on the basis of a signal outputted by the sheet detector.

16 Claims, 11 Drawing Sheets

(56) References Cited

U.S. PATENT DOCUMENTS

| | | | |
|---|---|---|---|
| 10,690,962 B2* | 6/2020 | Mifune | G02B 19/0023 |
| 10,995,933 B2* | 5/2021 | Aruga | F21V 5/045 |
| 2001/0022662 A1* | 9/2001 | Hosoda | H04N 1/00633 |
| | | | 358/1.9 |
| 2003/0057053 A1* | 3/2003 | Kano | G07D 7/121 |
| | | | 194/207 |
| 2004/0184022 A1 | 9/2004 | Kamiyama et al. | |
| 2010/0117290 A1* | 5/2010 | Izumichi | B65H 3/0607 |
| | | | 271/11 |
| 2017/0359867 A1* | 12/2017 | Yuki | F21V 19/00 |
| 2018/0217448 A1* | 8/2018 | Mifune | G02F 1/133603 |
| 2018/0217449 A1* | 8/2018 | Mifune | G02F 1/133603 |
| 2020/0110301 A1* | 4/2020 | Harrold | G02F 1/133509 |
| 2020/0231395 A1 | 7/2020 | Mitamura | |
| 2020/0385225 A1* | 12/2020 | Mitamura | B65H 3/5215 |

* cited by examiner

SHEET FEEDING DEVICE AND IMAGE READING APPARATUS

FIELD OF THE INVENTION AND RELATED ART

The present invention relates to a sheet feeding device for feeding an apparatus with a sheet of recording medium, and to an image forming apparatus equipped with the sheet feeding device.

There has been proposed in Japanese Laid-open Patent Application No. 2004-299907, a document feeding device which has: a document placement tray in which documents are placed in layers; and a document delivery tray, in which the documents in the document placement tray are discharged. The top portion of the document feeding device is provided with a cover, which is provided with an LED, which turns on as a document is properly set in the document tray. As light is emitted from the LED, it is projected upon the inward surface of the display screen. Generally speaking, an LED to be employed by an image reading apparatus, to illuminate the display screen is of the so-called dome type, from the standpoint of cost. Also generally speaking, an LED of the so-called dome type is relatively small in the area of illumination, is likely to be nonuniform in illuminance, being therefore unable to uniformly illuminate the screen of the display section. Thus, the employment of an LED of the dome type as the light source for the image reading apparatus makes it possible that a user will not be able to correctly read the screen of the display section.

SUMMARY OF THE INVENTION

According to an aspect of the present invention, there is provided a sheet feeding device comprising: a stacking tray configured to stack a sheet; a sheet presence-absence detector configured to detect presence/absence of the sheet on said stacking tray; a feeding portion configured to feed the sheet detected by said sheet presence-absence detector; an LED provided adjacent to the sheet stacked on said stacking tray and configured to emit light; a display portion provided substantially in parallel with an optical axis of said LED and configured to be illuminated by the light emitted from said LED; a reflector provided opposed to said display portion and configured to reflect and scatter the light emitted by said LED, toward said display portion; and a controller configured to control emission of the light of said LED on the basis of a signal outputted by said sheet presence-absence detector.

Further features of the present invention will become apparent from the following description of exemplary embodiments with reference to the attached drawings.

Figure 4:
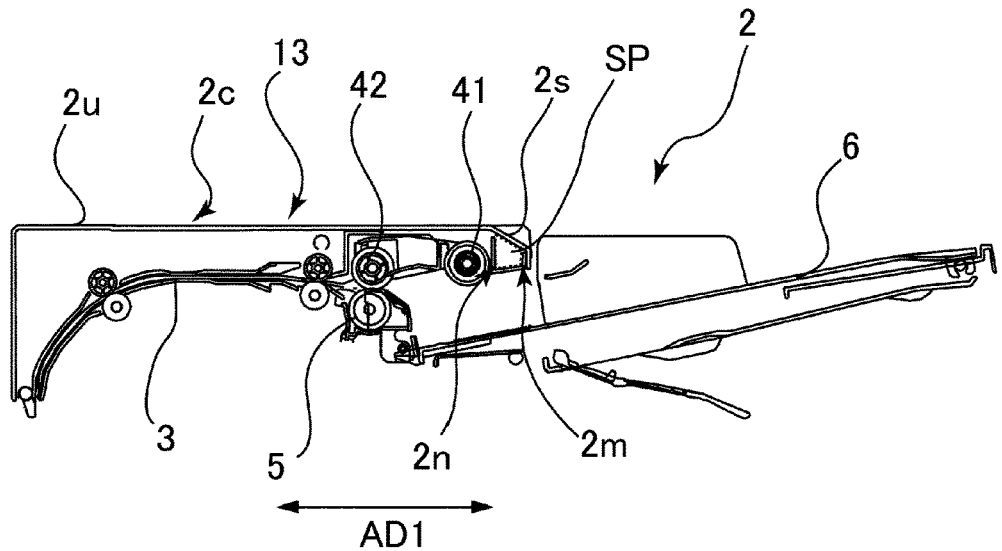
Figure 4:
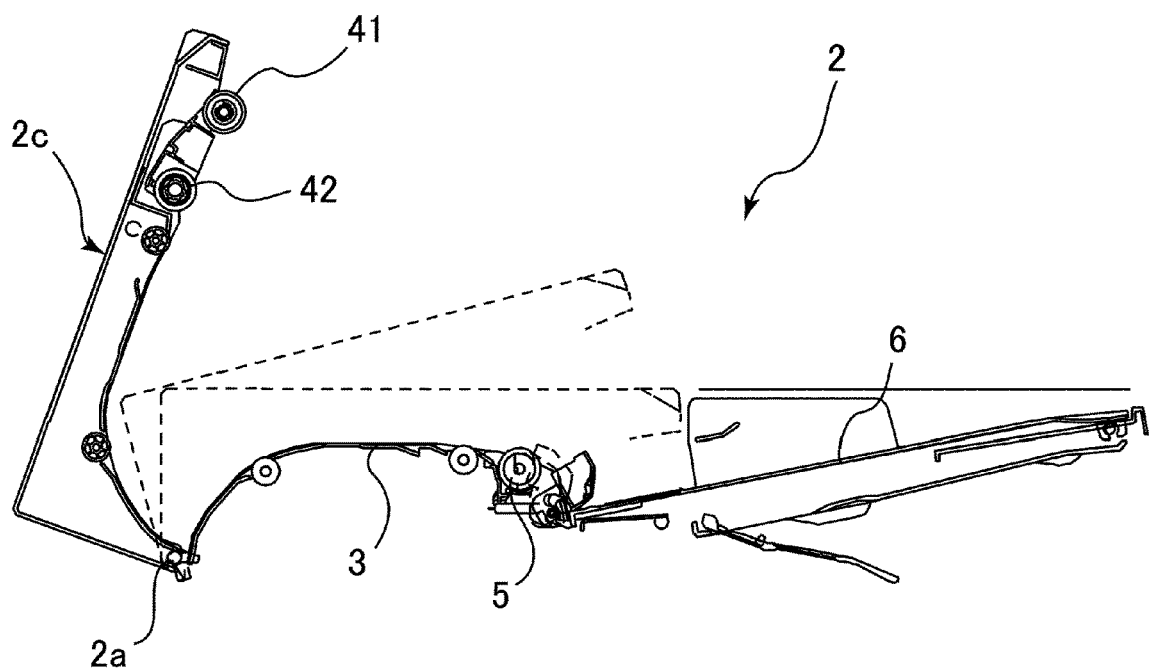

Parts (a) and (b) of FIG. 4 are sectional views of the ADF when the cover section of the ADF is remaining closed, and open, respectively.

Figure 5:
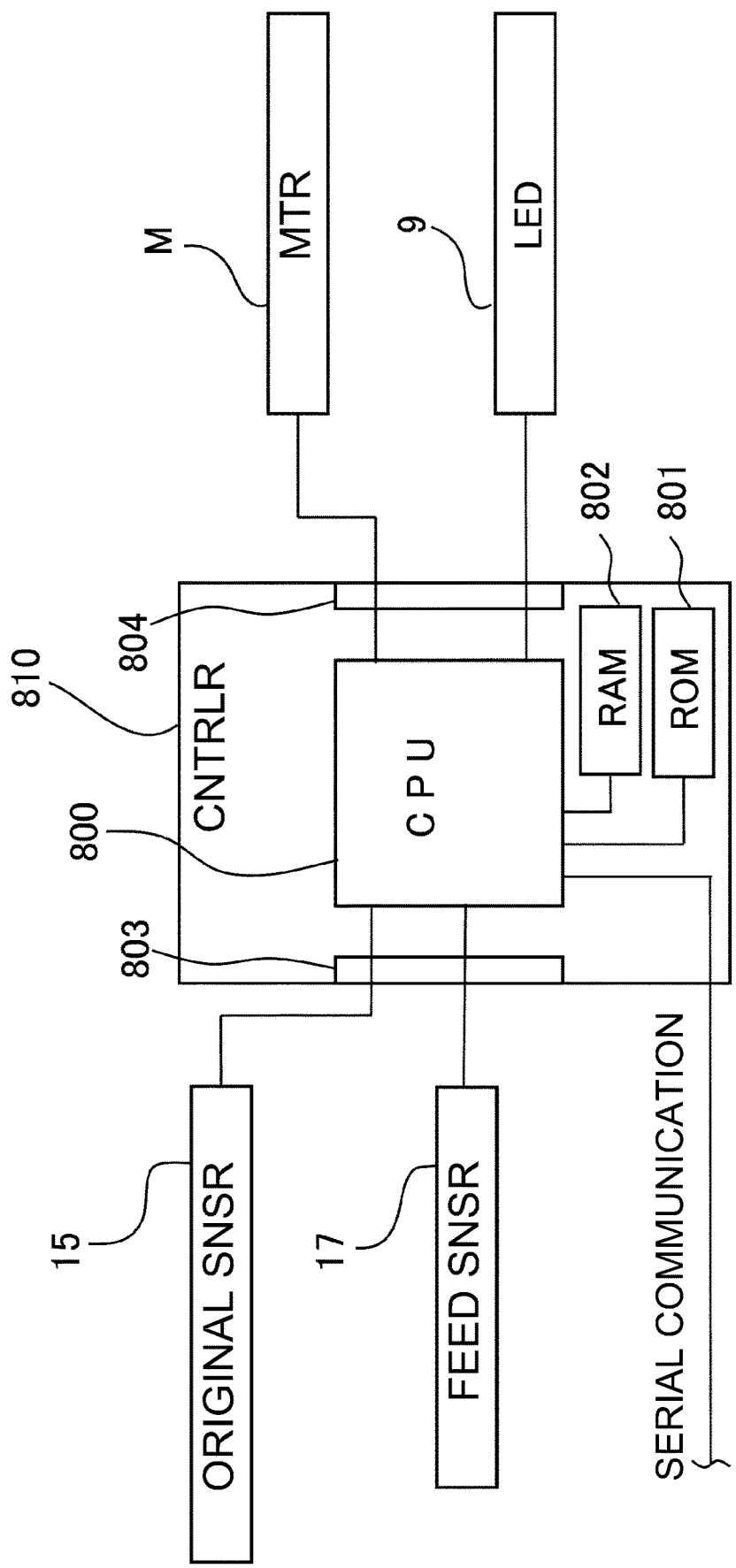

FIG. 5 is a block diagram of the control system.

Figure 6:
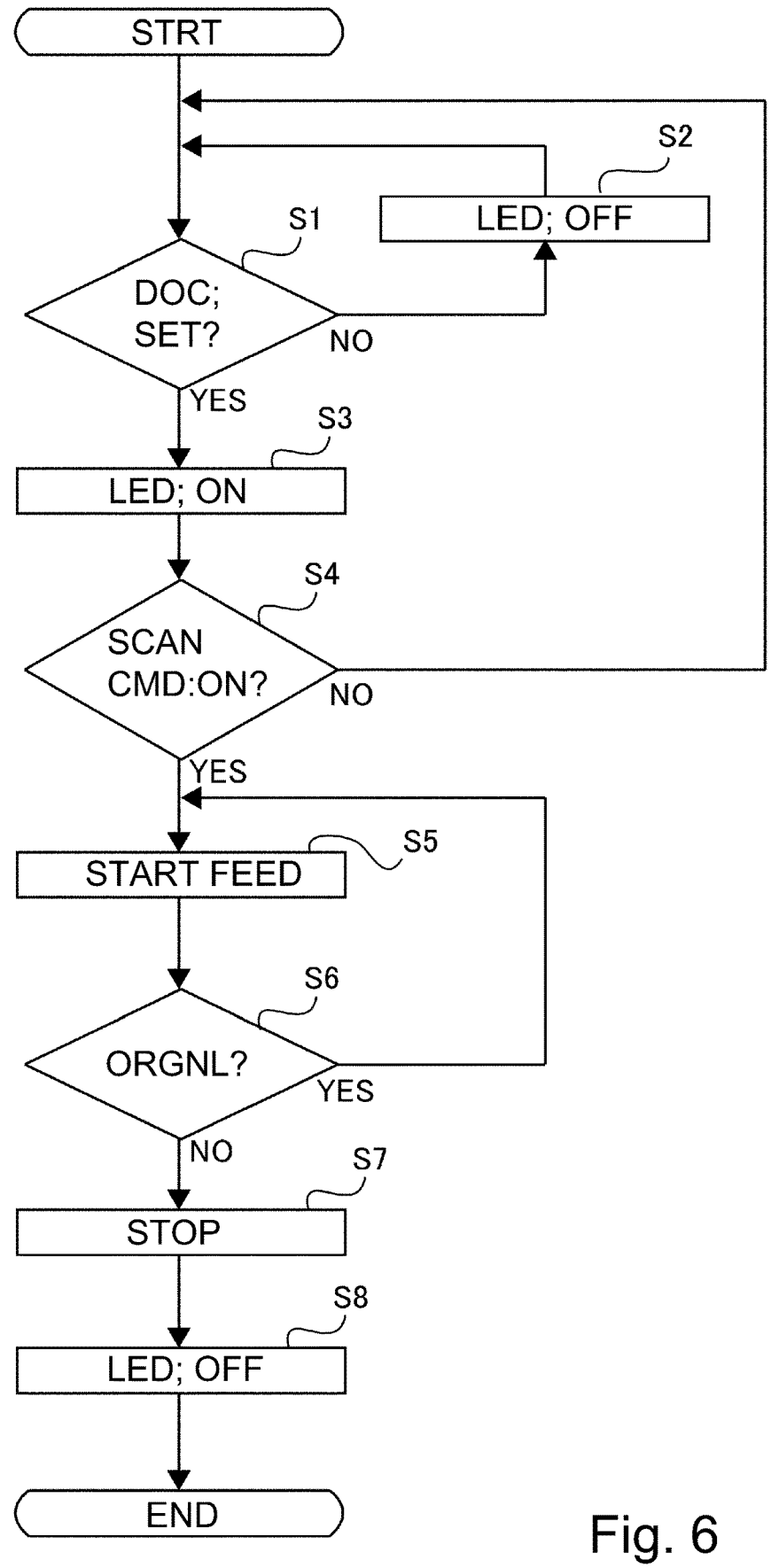

FIG. 6 is a flowchart of the sequence for controlling (turning on or off) the LED.

Figure 7:
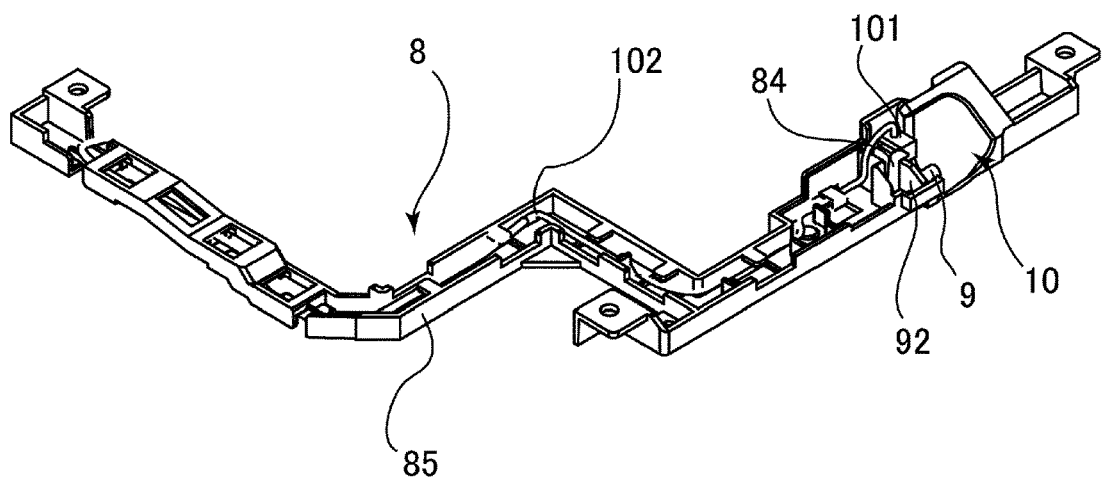

FIG. 7 is a perspective view of the holding member.

Figure 8:
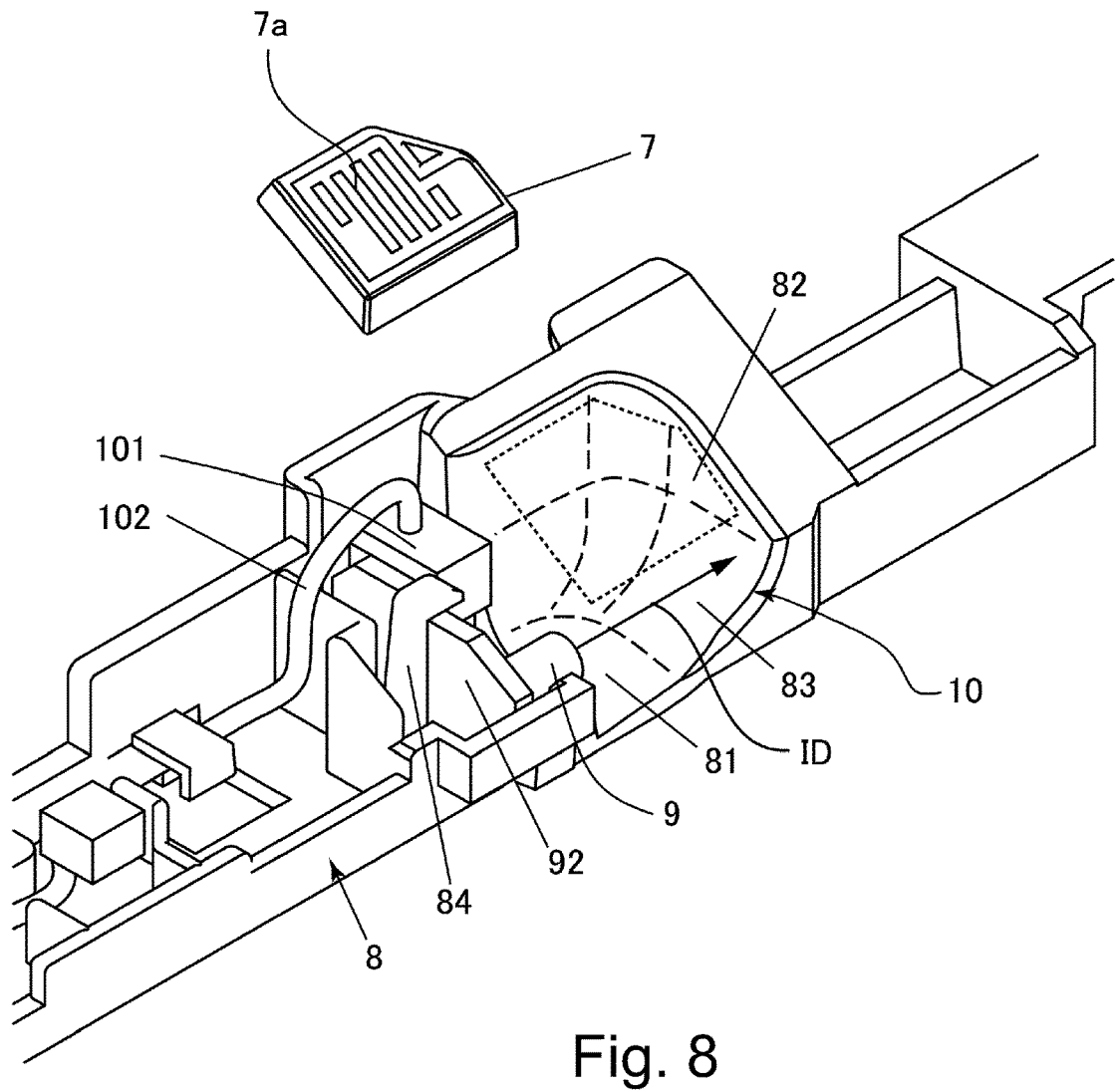

FIG. 8 is a perspective view of the display portion, and its adjacencies, of the image reading apparatus; it shows the structure of the display portion, and its adjacencies.

Figure 9:
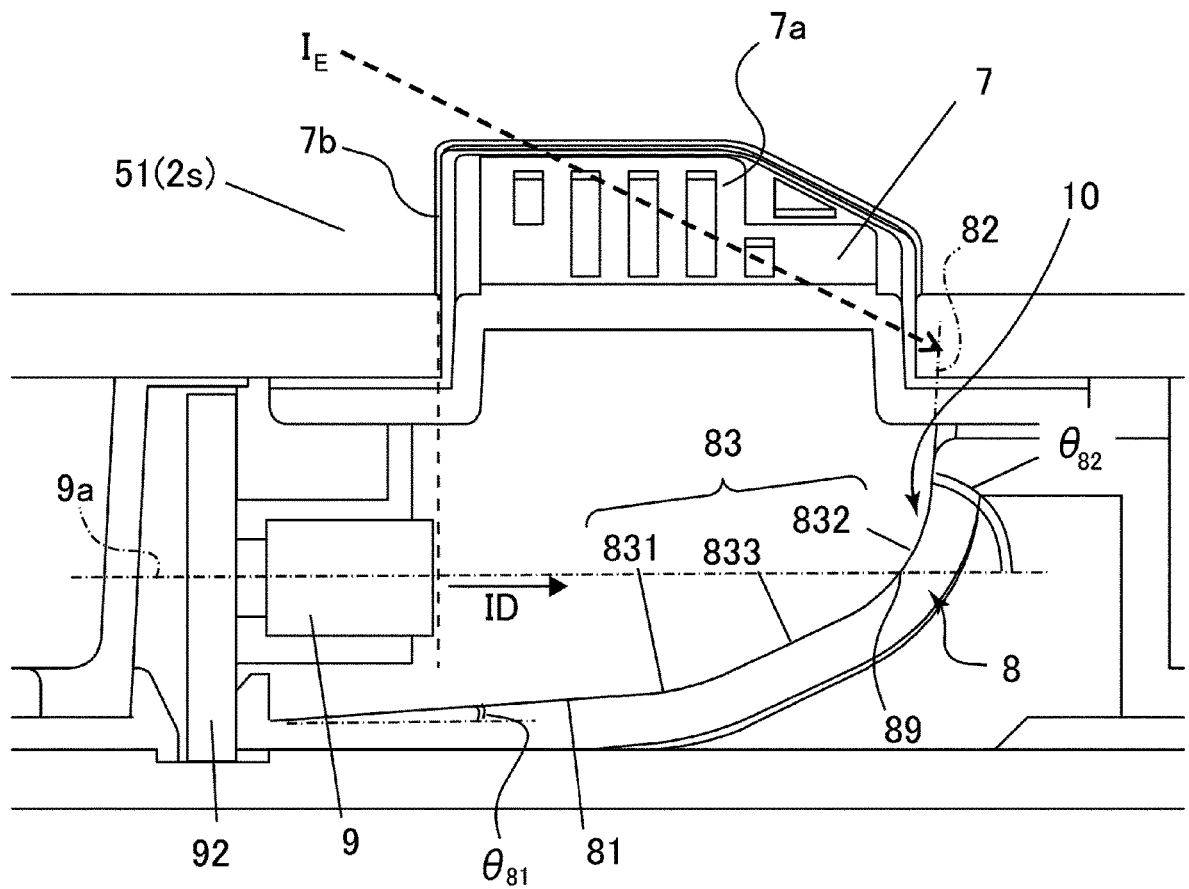

FIG. 9 is a sectional view of the display portion, and its adjacencies, of the image reading apparatus; it shows the structure of the display portion, and its adjacencies.

Figure 10:
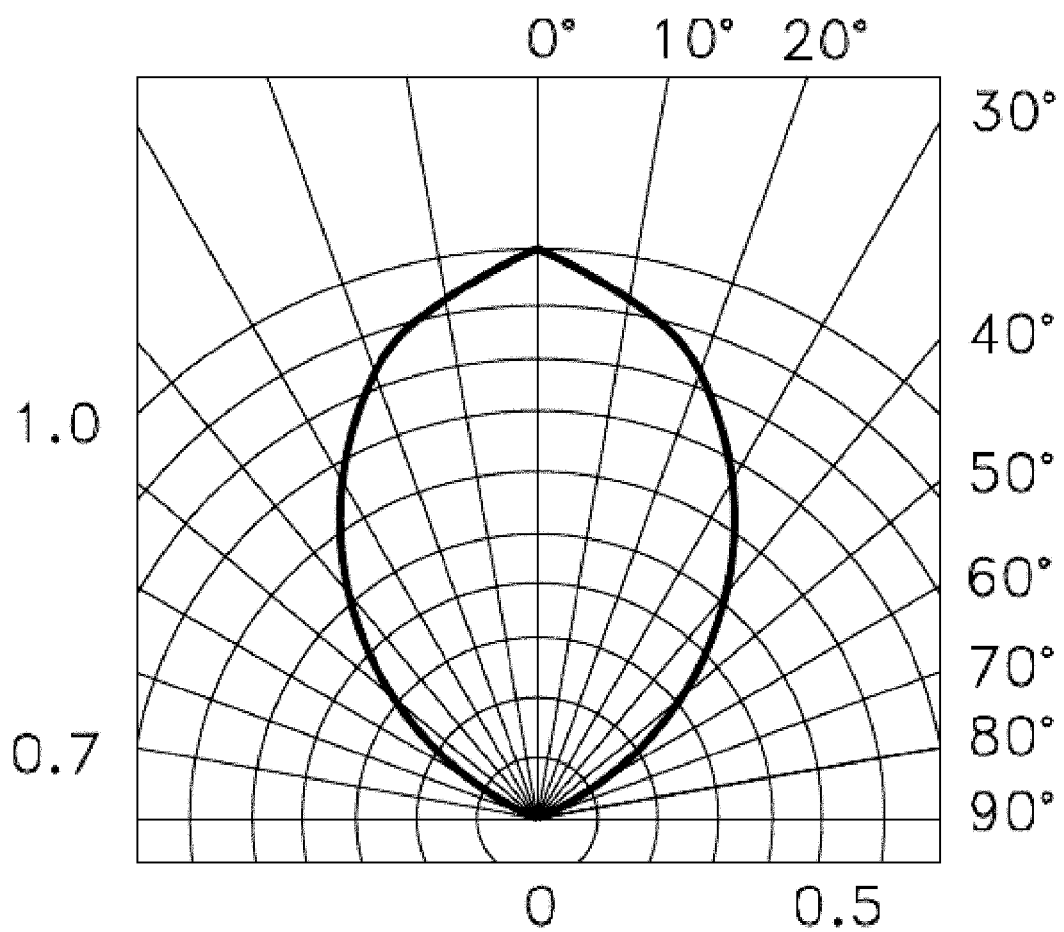

FIG. 10 is a graphic chart which shows the directional characteristics of the LED.

Figure 11:
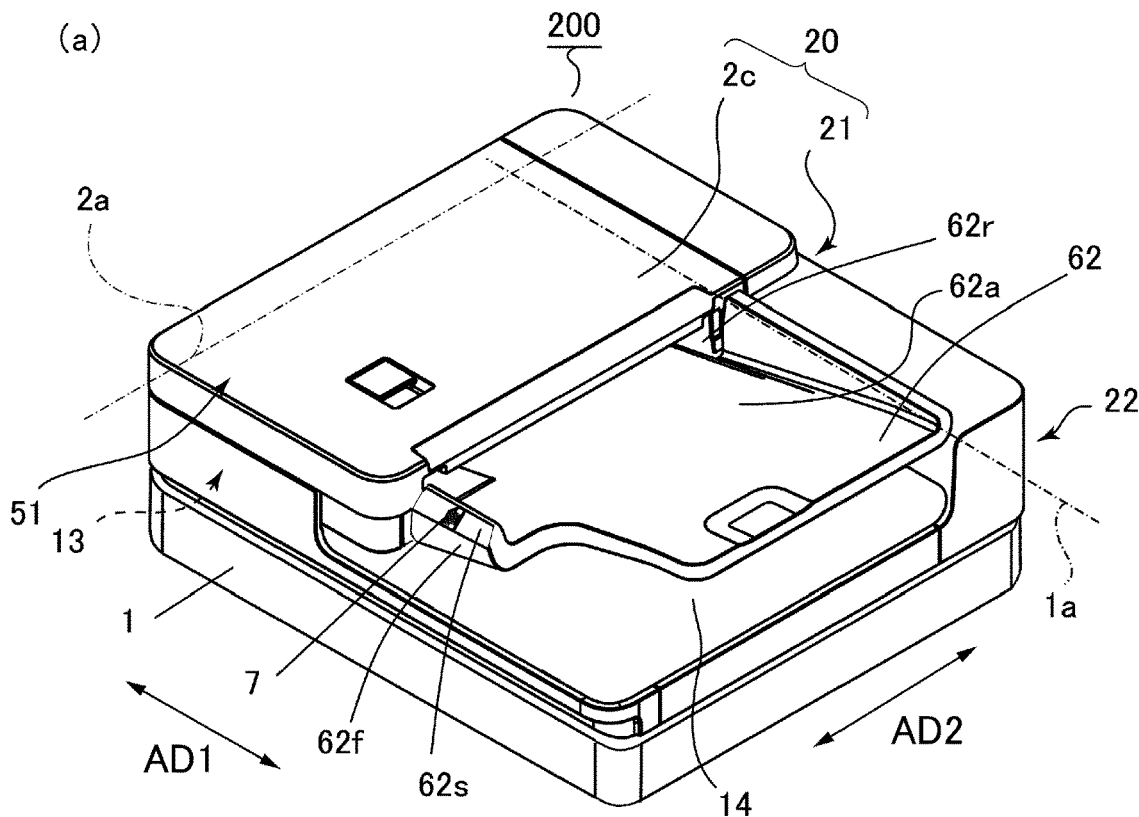
Figure 11:
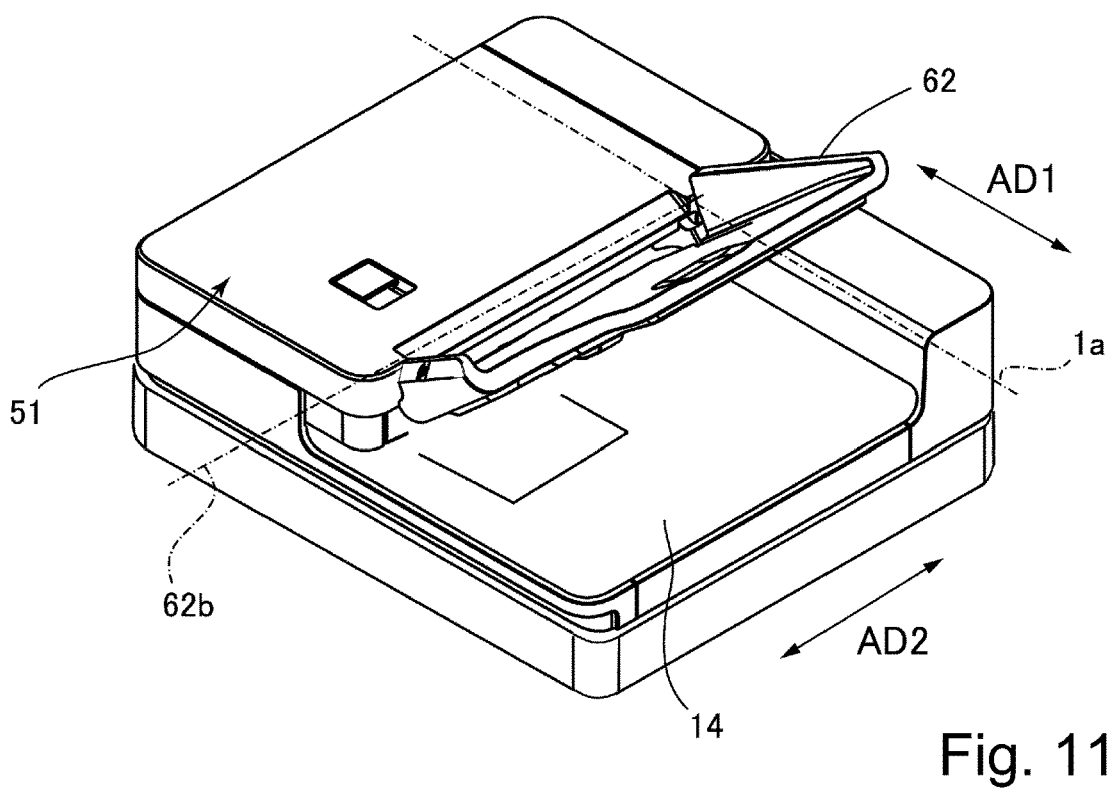

Parts (a) and (b) of FIG. 11 are perspective views of the image reading apparatus in the second embodiment of the present invention, and part (b) of FIG. 11 is a perspective view of the image reading apparatus after the upward pivoting of its document (original) tray.

Figure 12:
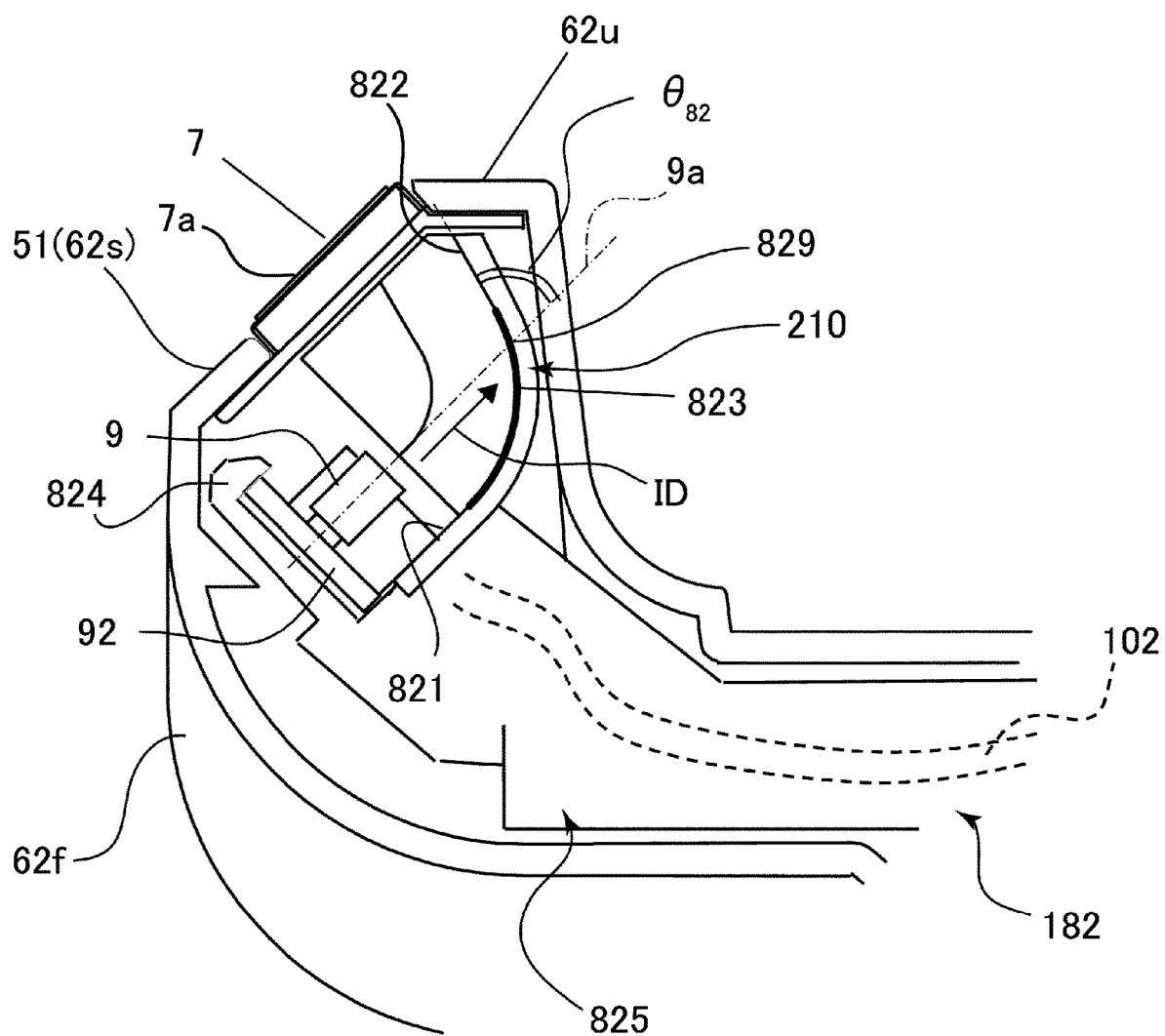

FIG. 12 is a sectional view of the display portion, and its adjacencies, of the image reading apparatus in the second embodiment; it shows its structural arrangement for illuminating the screen of the display.

DESCRIPTION OF THE EMBODIMENTS

Embodiment 1

[Overall Structure]

Figure 1:
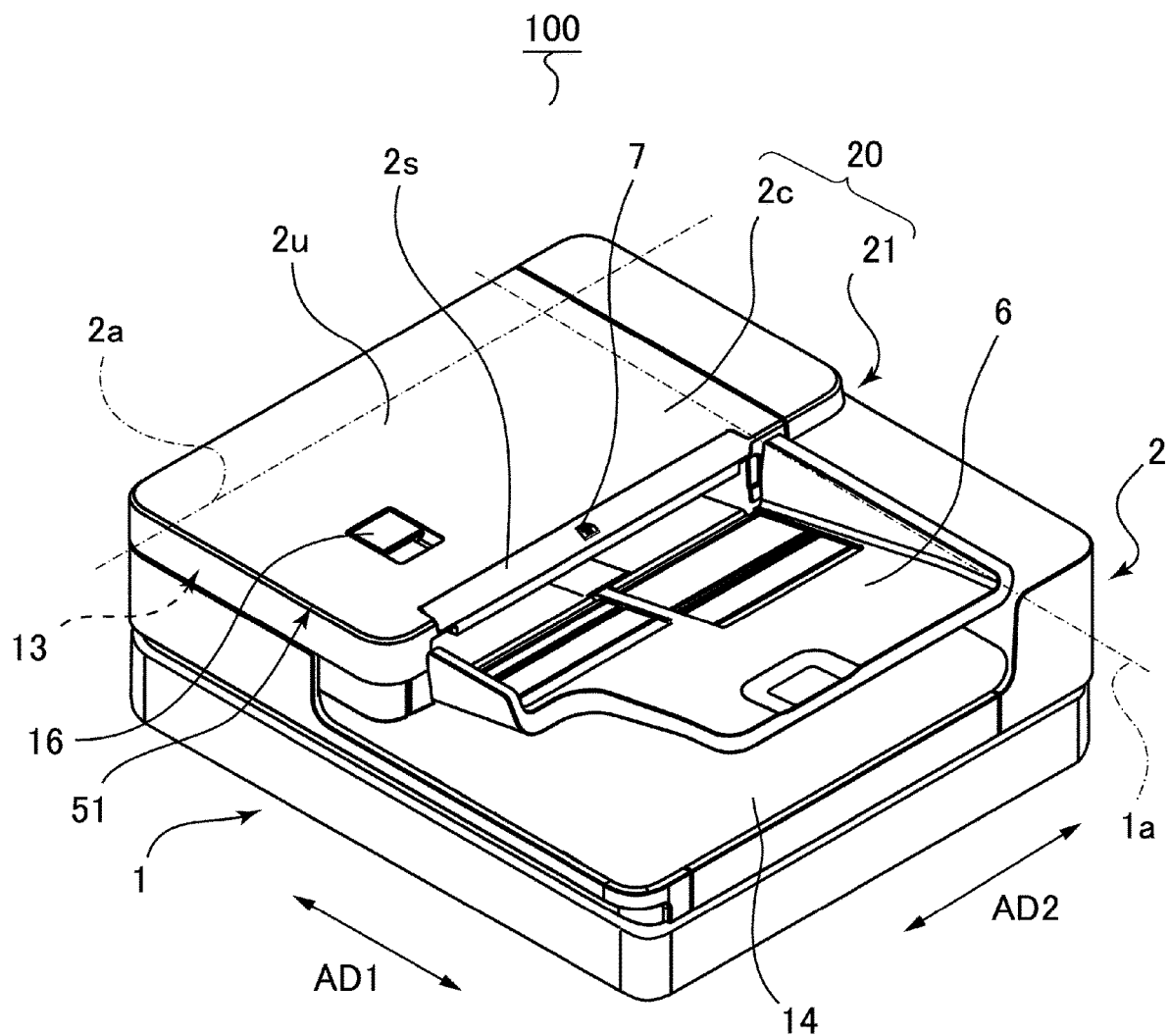
FIG. 1 is a perspective view of the image reading apparatus in the first embodiment of the present invention.
Figure 2:
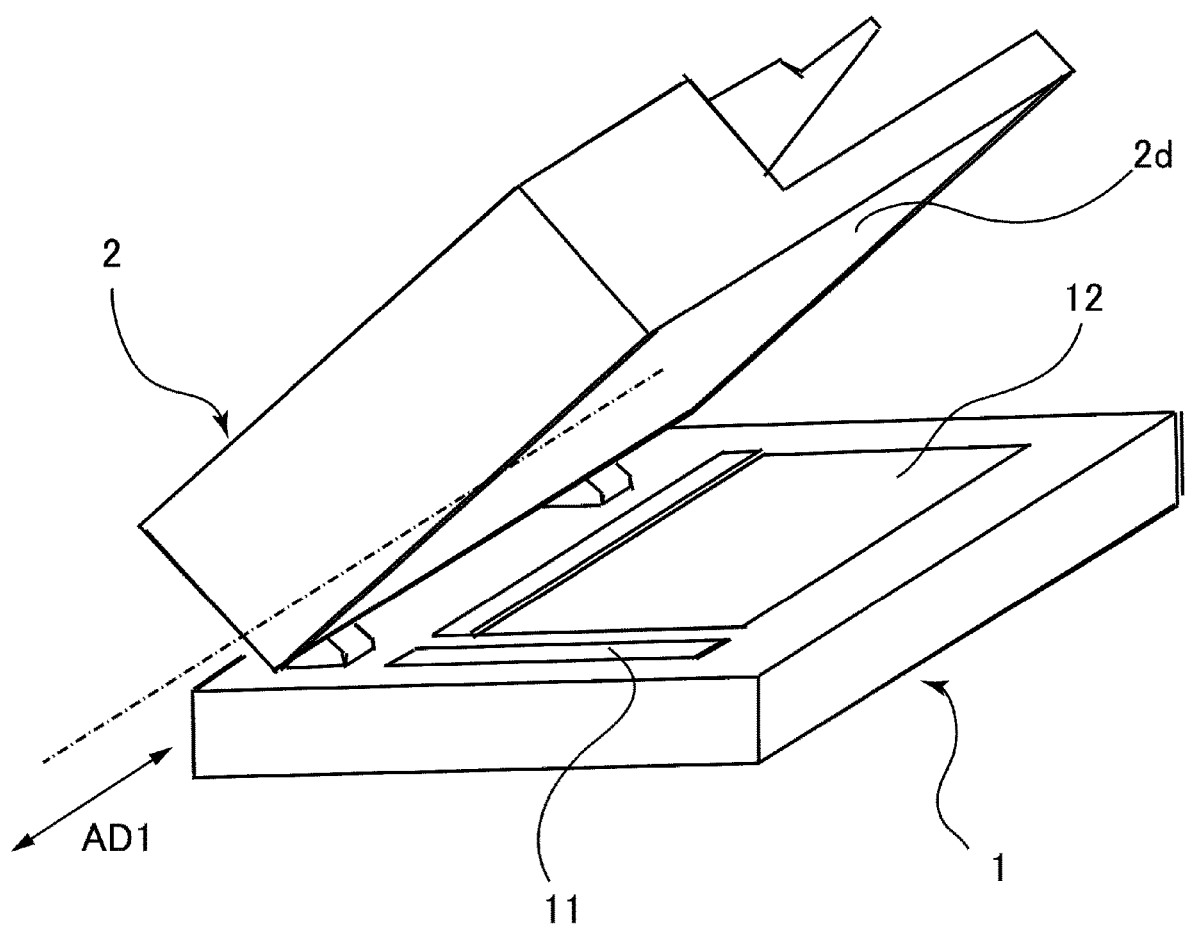
FIG. 2 is a perspective view of the image reading apparatus in the first embodiment.

To begin with, the present invention is described with reference to the first embodiment of the present invention. Referring to FIGS. 1 and 2, the image reading apparatus 100 in the first embodiment has a reading section 1 for reading the image on a sheet of recording medium, and an ADF 2 (Automatic Document Feeder) supported by the reading section 1.

The reading section 1 has a glass platen 11, a document placement glass 12, and an unshown scanner for reading the image of the original (document). The ADF 2, which is a sheet feeding device, has: a document (original) placement tray, in which documents (originals) are placed in layers; a feeding section for feeding the document in the document tray 6, into the reading section 1; a delivery tray 14 into which the documents (originals) are discharged after being fed into the reading section 1 by the feeding section 13.

Figure 3:
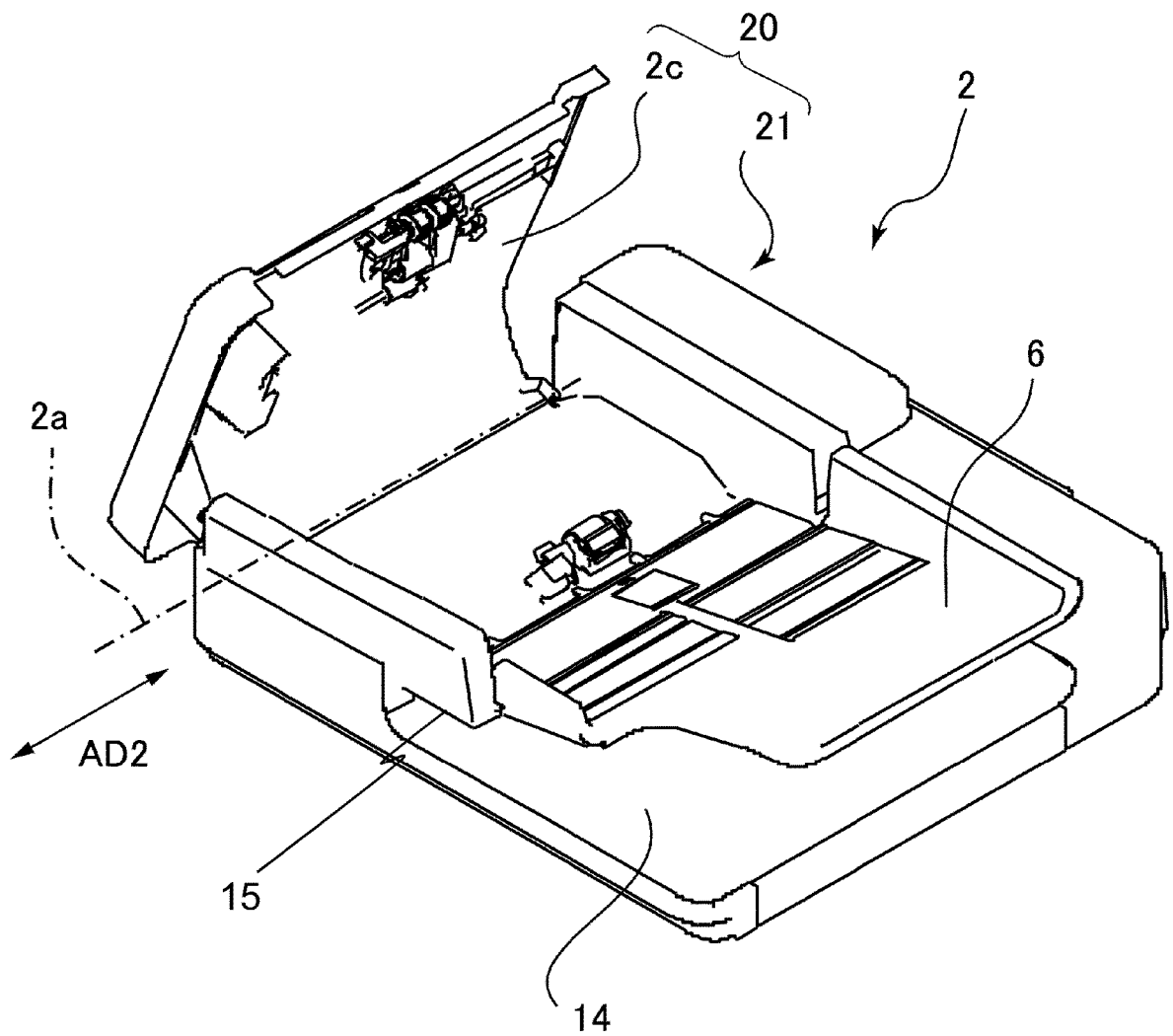
FIG. 3 is a perspective view of the ADF in the first embodiment when the cover section of the ADF is open.

Referring to FIGS. 3 and 4(a), the feeding section 13 has: a pickup roller 41 for feeding the documents in the document tray 6, into the reading section 1; a conveyance roller 42 for conveying the documents after the documents are fed into the reading section 1 by the pickup roller 41, and a separation roller 5 for separating the topmost document (original) in the document tray 6, from the rest in the tray 6, in coordination with the conveyance roller 42.

After the documents (originals) are fed one by one into the reading section 1 by the combination of the conveyance roller 42 and separation roller 5, each document is guided to the glass platen 11 through a document passage 3. After being moved along the top surface of the glass platen 11, the document is discharged into the tray 14 by an unshown pair of discharge rollers.

The image reading apparatus 100 can be operated in a mode (first mode) in which each document is scanned while being moved along the top surface of the glass platen 12, and a mode (second mode) in which each document is scanned while being kept stationary on the glass platen 11. The first mode is automatically selected as the layered documents in the document tray 6 are detected by a document sensor 15, or by a user with the use of an unshown control panel or the like.

Referring to FIGS. 1 and 2, the ADF 2 is supported in such a manner that it can be pivotally moved relative to the reading section 1 about the first shaft 1a, which extends in the first direction AD1. That is, the ADF 2 is pivotally movable about the first shaft 1a to be opened away, or closed upon, the document placement glass 12, making it possible to press a page of a thick original, such as a book, on the document placement glass 12, by the bottom surface 2d of the ADF 2, making it possible for the reading section 1 to read various originals.

Further, referring to FIGS. 3 and 4(b), the ADF 2 is provided with a cover 2c, which is supported by the second shaft 2a, which extends in the second direction AD2 and is perpendicular to the first direction AD1, in such a manner that it pivotally moves about the second shaft 2a. The aforementioned pickup roller 41 and conveyance roller 42 are supported by the cover 2c. By the way, the second direction AD2 does not need to be perpendicular to the first direction AD1 as long as it is intersectional to the first direction AD1.

Referring to FIG. 1, by the way, in this embodiment, the entirety of the external shell of the image reading apparatus 100 is referred to as a casing 20. The casing 20 comprises the cover portion 2c, and a base portion 21 which comprises the other portions of the casing 20 than the cover portion 2c. The cover portion 2c is supported by the base portion 21 in such a manner that it is pivotally movable about the second shaft 2a.

The cover portion 2c has: a top surface wall 2u, and a lock disengaging portion 16, with which the top wall 2u is provided; and a slant wall 2s. As the lock disengaging portion 16 is pulled upward, the cover portion 2c is unlocked from the base portion 21. The slant wall 2s is at the opposite end of the cover portion 2c from the second shaft 2a in terms of the first shaft direction AD1. By the way, the casing 20 has an external wall 51, which includes the slant wall 2s.

Further, the slant wall 2s is provided with a display 7, which is at the middle of the slant wall 2s in terms of the second shaft direction AD2. That is, the display 7 is at the opposite end of the cover portion 2c in terms of the first shaft direction AD1, and at the center of the cover portion 2c in terms of the second shaft direction AD2.

Parts (a) and (b) of FIG. 4 are sectional views of the ADF 2 when the cover portion 2c is remaining closed, and open, respectively. Referring to parts (a) and (b) of FIG. 4, the pickup roller 41, conveyance roller 42, and separation roller 5 of the ADF 2 are worn by the conveyance of documents, and therefore, reduce in performance in terms of conveyance. Therefore, they need to be periodically replaced. As the cover portion 2c is opened, it becomes easier for the pickup roller 41, conveyance roller 42, and separation roller 5 to be accessed, and therefore, easier to be replaced.

[Control System]

FIG. 5 is a block diagram of the control system in this embodiment. The image reading apparatus 100 has a control portion 810. The control portion 810 has: a CPU 800 which is a central processing apparatus; a ROM 801 which stores the programs to be run by the CPU 800; and a RAM 802, which is not only used as a work area, but also, temporarily stores data.

The input side of the control portion 810 is in connection to the document sensor 15, and a document conveyance sensor 17. The document sensor 15, which is for determining the presence or absence of a document, detects a document in the document tray 6, whereas the conveyance sensor 17 detects the document position in the document passage 3 as the document passes through the document passage 3. The output side of the control portion 810 is in connection to a motor M for driving each roller of the ADF 2, and an LED 9. The LED 9, which will be described later in detail, is disposed in the casing 20 to illuminate the screen portion 7a of the display 7. As the control portion 810 receives a scan start command from a user through a serial communication system, it begins to drive the motor M. In this embodiment, a photosensor of the reflection type, which does not directly contact the sheet (document) is employed as the document sensor 15. However, the document sensor 15 does not need to be a photosensor of the reflection type, as long as it can detect the presence (or absence) of a document. For example, it may be such a means that can detect the presence (or absence) of a document with the use of a combination of a rotational member which contacts a sheet (document), and a photosensor of the transmission type.

[Control (Turning on or Off) of LED]

Next, referring to the flowchart in FIG. 6, the controlling (turning on or off) of the LED 9 is described. First, the control portion 810 determines whether or not a document (original) is in the document tray 6, with the use of the document sensor 15 (Step S1). If no document is in the document tray 6 (Step S1: No), the control portion 810 turns off the LED 9, and returns to Step S1.

If a document is in the document tray 6 (Step S1: YES), the control portion 810 turns on the LED 9 (Step S3). For example, if the document is moved out of the document tray 6 after a document is placed in the document tray 6 and the LED 9 is turned on, the LED 9 turns off.

Next, the control portion 810 determines whether or not a scan start command is inputted by a user (Step S4). If a scan start command has not been inputted (Step 4: NO), the control portion 810 returns to Step S1.

If a scan start command is inputted (Step S4: YES), the control portion 810 starts a document (original) feeding operation in which it controls the motor M so that the document is fed into the reading section 1 (Step S5). Then, it determines whether or not a document is in the document tray 6, with the use of the document sensor 15 (Step S6). If a document is in the document tray 6 (Step S6: YES), the control portion 810 returns to Step S5, and continuously feeds documents until the end of a job.

If the control portion 810 determines that no document is in the document tray 6 (Step S6: NO), it stops the document feeding operation, and turns off the LED 9 (Steps S7 and S8). This is how the control portion 810 controls the LED 9. That is, if the document sensor 15 is indicating the presence of a document in the document tray 6, the LED 9 emits light, but, if the document sensor 15 is not indicating the presence of a document in the document tray 6, the LED 9 does not emit light. Therefore, if the LED 9 is on, and therefore, the display 7 is illuminated, a user can understand that a document is properly set in the document tray 6, or the document is being scanned.

[Illumination of Display Screen]

Next, the structure for illuminating the screen of the display 7 is described in detail. Referring to FIGS. 1 and 7, the ADF 2 has the holding member 8, which is on the inward side of the cover portion 2c. The holding member 8 has: a holding portion 85 for holding bundled wires 102 which are in connection to the control portion 810; a supporting portion 84 which supports a circuit board 92, to which the LED 9 is mounted; and a reflective portion 10 which diffusively reflects the light emitted from the LED 9. The holding member 8 is a monolithic component having the holding portion 85, supporting portion 84, and reflective portion 10, making it possible to reduce the reading unit 100 in cost by reducing it in component count, and also, making it easier to assemble the reading unit 100.

The LED 9 in this embodiment is of the so-called dome type. It has an unshown LED element, and a dome-shaped resinous portion in which the LED element is sealed. A dome type LED can be cheaply structured compared to a flux-type LED and a chip-type LED.

Referring to part (a) of FIG. 4, the cover portion 2c is provided with a storage space SP, which is in the adjacencies of the slant wall 2s. The shape of the storage space SP is such that its cross section at a plane which is perpendicular to the second shaft direction AD2 gradually widens starting from one (2m) of its lengthwise ends in terms of the first shaft direction AD1, toward the other end 2n. Further, referring to part (a) of FIGS. 4 and 8, the LED 9 is positioned at the end 2m of the storage space SP. At the other end 2n of the storage space SP, a connector 101 is placed, which is in connection to the circuit board 92 which is at one end of the bundled wires 102. The circuit board 92 is supplied with electrical power through the bundled wires 102 and connector 101.

Since the LED 9 is disposed in the narrow portion of the storage space SP as described above, the light from the LED 9 reaches even the first surface 81 of the reflective portion 10, making it possible to evenly illuminate the first surface 81. Further, the connector 101 is disposed in the wide portion of the storage space SP. Therefore, it is possible to employ a connector which is larger than conventionally employed ones. That is, the storage space SP is more efficiently utilized.

FIG. 8 is a perspective view of the display 7 and its adjacencies. It shows how the display 7 is illuminated. FIG. 9 is a sectional view of the display 7 and its adjacencies, at a vertical plane which coincides with the axial line ID of the LED 9 and display 7. Hereafter, this plane will be referred to as a plane CS. The broken line in FIG. 8 indicates where the display 7 is positioned. The axial line ID is parallel to the second shaft direction AD2 (FIG. 1).

Referring to FIGS. 8 and 9, the display 7 has a screen portion 7a which shows the orientation of the image bearing surface of the document in the document tray 6. In this embodiment, the screen portion 7a is indicating that a document (original) is to be placed in the document tray 6, in such an attitude that the image bearing surface of the document faces upward.

The screen portion 7a of the display 7 is formed of a transparent substance. However, it is tinted so that it appears white or black when the LED 9 is not on. In this embodiment, the screen portion 7a is tinted so that when the LED 9 is on, the screen portion 7a appears dark bluish green (160 degree in hue, RGB (0, 158, 115)), dark blue (202 degree in hue, RGB (0, 114, 178)), light blue (202 degree, RGB (86, 180, 233)), for the following reason. That is, the external wall 51 of the casing 20 is white. Thus, tinting the screen portion 7a of the display 7 as described above makes it possible for even a user with weak eyesight to easily recognize that the LED 9 is on. In other words, the tinting can give a user a sense of security that the documents in the document tray 6 are properly orientated. The reflective portion 10 is white. Thus, a user can recognize the color of the light which is emitted from the LED 9 and diffused by being reflected by the reflective portion 10, through the screen portion 7a.

The reflective portion 10 has: the second surface 82 which is disposed on the downstream side of the first surface 81 in terms of the light emission direction ID, and the third surface 83 which bridges between the first surface 81 and second surface 82. The first surface 81 and second surface 82 are flat. Referring to FIG. 9, the first surface 81 holds the first angle $\Theta_{81}$ relative to the light emission direction ID, in the plane CS. The second surface 82 holds the second angle $\Theta_{82}$, which is greater than the first angle $\Theta_{81}$, relative to the light emission direction ID, in the plane CS.

The first angle $\Theta_{81}$ is preferred to be no less than 0° and no more than 30°. There is provided a preset distance (4.0 mm-5.0 mm) between the first surface 81 and LED 9. In this embodiment, by the way, the distance between the first surface 81 and LED 9 is 4.3 mm. If the first surface 81 and the optical axis 9a are close to each other, the illuminance distribution of the LED 9 on the first surface 81 becomes roughly similar to the directional characteristics of the LED 9, which is shown in FIG. 10. That is, it is problematic in uniformity. In this embodiment, however, the preset distance is provided between the first surface 81 and LED 9. Therefore, the first surface 81 is illuminated by the light from the LED 9 after the light is dispersed by a certain amount proportional to the preset distance. Therefore, the reading unit 100 in this embodiment is superior to any conventional one in terms of the uniformity in which the first surface 81 is illuminated. The aforementioned optical axis 9a is the line which connects the center of the light emission of the LED element of the LED 9, and the tip of the dome-shaped portion of the LED 9. Further, the second angle $\Theta_{82}$ is desired to be no less than 60° and no more than 90°. The top end of the second surface 82 extends close to the slant wall 2s of the external wall 51. Therefore, the second surface 82 is higher in the luminance of the light from the LED 9. Therefore, a user can better recognize the light emitted from the LED 9 even when the user looks at the screen portion 7a of the display 7 from diagonally above the display 7, because if a user looks at the screen portion 7a of the display 7 from diagonally above the shutter 7, the user's line of sight Is coincides with the second surface 82.

Further, if there is a gap between the external wall 51 and second surface 82, the portion of the screen portion 7a of the display 7, which corresponds to the gap between the external wall 51 and second surface 82 appears darker, making the screen portion 7a of the display 7 nonuniform in luminance, when a user sees the screen portion 7a of the display 7 from diagonally above the display 7. In this embodiment, however, the reading unit 100 is structured so that the second surface 82 is positioned close to the external wall 51. Therefore, it is minimized in the gap, and therefore, the reading unit 100 in this embodiment is substantially less in the nonuniformity of the screen portion 7a of the display 7 in terms of luminance than any conventional one.

The third surface 83 has: a curved portion 831, which is continuous from the first surface 81; a curved portion 832, which is continuous from the second surface 82; and a curved portion 833 which is continuous from the portions 831 and 832. That is, the third surface 83 has at least one curved portion. By connecting the first surface 81 to the third surface 83 by the curved portion 831, and the second surface 82 to the third surface 83 by the curved portion 832, it is possible to prevent the portions of the screen portion 7a of the display 7, which correspond to the joint between the first surface 81 and third surface 83, and the joint between the third surface 83 and second surface 82, respectively, from appearing darker. Therefore, it is possible to make the screen portion 7a of the display 7 uniform in luminance. By the way, the third surface 83 may be a simple curved surface, or may have three or more curved portions.

Referring to FIG. 9, the optical axis 9a of the LED 9 is intersectional to the curved portion 832 of the third surface 83. In other words, the intersection 89 between the optical axis 9a and third surface 83 is closer to the second surface 82 than the first surface 81. By reflecting the light emitted from the LED 9 as far a point as possible from the LED 9 as described above, the reading unit 100 is improved in the uniformity in the luminance at the reflective portion 10, and in the visibility of the screen portion 7a of the display 7.

Further, the first surface 81, second surface 82, and third surface 83 are all textured. More specifically, these surfaces 81, 82 and 83 are all provided with minute protrusions and recesses, which improves the surfaces in the capability to scattering the light.

Further, the LED 9 is disposed on the upstream side of the upstream edge of the screen portion 7a of the display 7 in terms of the light emission direction ID. Therefore, it is kept out of the line of sight of a user by the external wall 51. In other words, a user cannot directly see the LED 9. That is, what a user sees in the screen portion 7a of the display 7 illuminated by the light which has been emitted by the LED 9 and scattered by these surfaces 81, 82 and 83. Therefore, the screen portion 7a of the display 7 in this embodiment is superior in the visibility of the screen portion 7a of the display 7 than that of any conventional reading apparatus. Further, the light emission direction ID of the LED 9 is parallel to the surface of the screen portion 7a of the display 7. Therefore, it is unlikely for the light emitted by the LED 9 to be directly seen by a user.

As described above, in this embodiment, it is the cover portion 2c that is provided with the display 7 for indicating a user the orientation of the image bearing surface of a document (original), and whether or not a document (original) is present on the document tray 6, or glass platen 11. To describe in greater detail, the display 7 is positioned at the opposite end of the cover portion 2c in terms of the first shaft direction AD1, and at the center of the cover portion 2c in terms of the second shaft direction AD2. This position of the display 7 is directly above the document (original) in the document tray 6. Therefore, it makes it easier for a user to see the screen portion 7a of the display 7, prompting the use to correctly set a document in the document tray 6, when the user sets a document in the document tray 6. Further, the orientation of a document (original), and whether or not the document is present in the document tray 6, are shown by a single displaying means, that is, the display 7, preventing a user from distracted.

Further, the pickup roller 41 and conveyance roller 42 are disposed in the adjacencies of the display 7. Therefore, there is only a small space on the underside of the display 7 of the cover portion 2c. For example, if the LED 9 is aimed toward the screen portion 7a of the display 7, a substantial amount of space is necessary below the display 7, in order to uniformly illuminate the screen portion 7a of the display 7.

In this embodiment, therefore, the image reading apparatus 100 is provided with the LED 9 which is of the dome-shaped type, being therefore, inexpensive, and the reflective portion 10 which diffusively reflects the light emitted from the LED 9. Further, not only is the reflective portion 10 positioned so that it opposes the screen portion 7a of the display 7, but also, the LED 9 is positioned a preset distance away from the reflective portion 10 to make the light emitted from the LED 9 reach the screen portion 7a of the display portion 7 after it disperses more or less, and is diffusively reflected by the reflective portion 10.

Thus, the reflective portion 10 of the image reading apparatus 100 in this embodiment is more uniformly illuminated, being therefore more uniform in luminance. Therefore, the screen portion 7a of the display 7 is substantially superior in visibility than that of any conventional image reading apparatus.

Embodiment 2

[Overall Structure]

Next, the present invention is described with reference to the second embodiment of the present invention. The second embodiment is different from the first embodiment only in the positioning of the display 7. Therefore, the components of the image reading apparatus 200 in this embodiment, portions of the components, etc., which are similar in structure to the counterparts in the first embodiment are not illustrated, and/or given the same referential codes as those given to the counterparts, and are not described.

Referring to part (a) of FIG. 11, the image reading apparatus 200 in this embodiment has: a reading section 1 which reads the image on a sheet of recording medium; and an ADF 22 (Automatic Document Feeder) supported by the reading section 1.

The ADF 22, which is a sheet feeding-conveying apparatus, has a document (original) tray 62 in which documents (originals) are disposed in layers; a feeding portion 13 which feeding the layered documents in the document (original) tray 62 into the main assembly of the reading unit 200; and a delivery tray 14, in which the documents are discharged after being conveyed by the feeding-conveying portion 13. The document (original) tray 62 has: a document placement surface 62a, on which documents are placed in layers; and a regulating portion 62f, which is one of the end portions of the document (original) tray 62, in terms of the widthwise direction which is intersectional to the document conveyance direction, and which is for regulating each document (original) in position in terms of the widthwise direction.

The regulating portion 62f is provided with a slant wall 62s which downwardly extends in the outward direction in terms of the widthwise direction. The slanted wall 62s is provided with the display 7. The regulating portion 62f is provided on the front side of the apparatus, which faces toward a user. A user is to set documents (originals) in contact with the regulating portion 62f regardless of original document size, even if multiple documents which are different in size are placed in the document tray 6. Therefore, a user can focus his or her visual attention to the display 7. That is, this embodiment can improve an image reading apparatus in the visibility of the screen of its display.

Further, referring to part (b) of FIG. 11, the document (original) tray 62 is supported in such a manner that it is pivotally rotatable about a tray shaft 62b which is parallel to the second shaft direction AD2. Therefore, the documents in the delivery tray 14 can be easily taken out of the delivery tray 14 by upwardly pivoting the document tray 6.

[Structural Arrangement for Illuminating Screen of Display]

Next, the structural arrangement for illuminating the screen portion 7a of the display 7 is described in detail. FIG. 12 is a sectional view of the display 7 and its adjacencies, at a plane which is parallel to the light emission direction ID of the LED 9, and also, coincides with the display 7. Hereafter, this plane will be referred to as a plane CS. FIG. 12 shows the portions of the display 7, which are on the inward side of the regulating portion 62f Referring to FIG. 12, there is provided a holding member 182, on the inward side of the regulating portion 62f The holding member 182 is a monolithic member formed of a resinous substance.

The holding member 182 has: a holding portion 825 which holds the bundled wires 102 which are in connection to the control portion 810 (FIG. 5); a supporting portion 824 which supports the circuit board 92, to which the LED 9 is attached; and a reflective portion 210 which diffusively reflects the light from the LED 9. The holding portion 825 holds the bundled wires 102, as the bundled wires 102 extend to the rear end 62r (part (a) of FIG. 11) of the document (original) tray 62r. The circuit board 92 is supplied with electric power through the bundled wires 102.

The reflective portion 210 has the first surface 821; second surface 822, which is on the downstream side of the first surface 821 in terms of the light emission direction ID; and the third surface 823 which connects between the first surface 821 and second surface 822. The first and second surfaces 821 and 822 are flat.

The first surface 821 is disposed a preset distance (4.0 mm-5.0 mm) from the LED 9. In this embodiment, by the way, the first surface 821 is positioned 4.3 mm away from the LED 9. If the first surface 821 is in the proximity of the optical axis 9a of the LED 9, the distribution of the light from the LED 9 on the first surface 821 becomes roughly the same as the directional characteristics of the LED 9 which is shown in FIG. 10, being therefore problematic in terms of uniformity. In this embodiment, however, a preset amount of distance is provided between the first surface 821 and LED 9. Therefore, the light emitted from the LED 9 illuminates the first surface 821 after being diffused by an amount which is proportional to the preset distance. Therefore, the image reading apparatus 200 in this embodiment is substantially superior in terms of the uniformity of the luminance at the first surface 821.

Further, it is desired that the second angle $\Theta_{82}$, in the plane CS, between the light emission direction ID and the second surface 822 is no less than 60° and no more than 90°. The second surface 822 extends upward far enough for its top edge to be close to the slanted wall 62s of the external wall 51. Because the image reading apparatus 200 in this embodiment is structured as described above, it is higher in the luminance of the light from the LED 9 at the second surface 822. Therefore, even if the screen portion 7a of the display 7 is looked down at, at an angle, the line of sight of an observer (user) coincides the second surface 822. Therefore, the screen portion 7a of the display 7 illuminated by the light from the LED 9 is excellently visible.

Further, if there is a gap between the external wall 51 and second surface 822, the portion of the screen portion 7a of the display portion 7, which corresponds to the gap between the external wall 51 and second surface 822 appears darker than the surrounding areas, and therefore, the screen portion 7a appears nonuniform in luminance, when the screen portion 7a of the display portion 7 is looked from the top side, at an angle. In this embodiment, however, the image reading apparatus 200 is structured so that the top edge of the second surface 822 is positioned very close to the external wall 51 to reduce the aforementioned gap. Therefore, the image reading apparatus 200 in this embodiment is substantially less in the nonuniformity in the luminance of the screen portion 7a of its display 7.

The third surface 823 is similar in structure as the third surface 83 in the first embodiment. Therefore, the portions of the screen portion 7a of the display 7, which correspond to the joint between the first surface 821 and third surface 823, and the joint between the second surface 822 and third surface 823, do not appear darker than the surrounding areas of the screen portion 7a. Therefore, the screen portion 7a of the display 7 appears substantially more uniform in luminance than that of any conventional image reading apparatus.

Further, the optical axis 9a of the LED 9 is intersectional with the third surface 823. In other words, the point of intersection between the optical axis 9a and third surface 823 is closer to the second surface 822 than the first surface 821. That is, the image reading apparatus 200 in this embodiment is structured so that the light from the LED 9 is reflected as far away as possible from the LED 9. Therefore, the image reading apparatus 200 is superior in the luminance at the reflective portion 210, and therefore, visibility of the screen portion 7a of the display 7, to any conventional image reading apparatus.

Further, the first, second, and third surfaces 821, 822 and 823 are all textured. That is, they all have numerous minutes peaks and valleys. Therefore, the image reading apparatus 200 in this embodiment is superior in the diffusion of the light from the LED 9, to any conventional image reading apparatus.

As described above, in this embodiment, the regulating portion 62f which is on the front side of the document (original) placement tray 62 is provided with the display 7 for showing the orientation and state of the image bearing surface of a document (original). Therefore, the position of the screen portion 7a of the display 7 is easier to recognize by a user who sets a document (original) in contact with the regulating portion 62f. That is, the image reading apparatus 200 in this embodiment is superior to any conventional image reading apparatus, in the visibility of the screen portion 7a of the display 7. Further, the image reading apparatus 200 in this embodiment is structured so that the light emitted from the LED 9 is diffusively reflected by the reflective portion 210. Therefore, it is superior to any conventional image reading apparatus, in the nonuniformity in the luminance of the screen portion 7a of the display 7. Therefore, it is superior to any conventional image reading apparatus in the visibility of the screen portion 7a of the display 7.

OTHERS

By the way, in the first embodiment, the slant wall 2s is provided with the screen portion 7a of the display 7, whereas in the second embodiment, the regulating portion 62f is provided with the screen portion 7a of the display 7. These embodiments, however, are not intended to limit the present invention in scope. That is, as long as it is a part o the external wall 51 that is provided with the screen portion 7a of the 7d, it does not matter what portion of the external wall 51 of the casing 20 is provided with the screen portion 7a of the display 7.

Further, in either of the embodiments described above, the screen portion 7a of the display 7 was illuminated with the LED 9. However, these embodiments are not intended to limit the present invention in scope. Other light sources than the LED 9 may be employed in place of the LED 9. For example, an incandescent lamp, a halogen lamp, a fluorescent lamp, or the like may be employed. Further, a flux type LED, or a chip type LED may be employed instead of an LED of the dome type.

Further, in either of the embodiments described above, the optical axis 9a of the LED 9 was intersectional with the third surface 83, 823. These embodiments, however, are not intended to limit the present invention in scope.

For example, the present invention is also applicable to an image reading apparatus structured so that the optical axis 9a of the LED 9 is intersectional with the first surface 81, 821, and the second surface 82, 822.

Further, in either of the embodiments described above, the display 7 showed the orientation of the image bearing surface of a sheet of recording medium. These embodiments, however, are not intended to limit the present invention in scope in terms of what the display 7 shows. That is, the display 7 may show anything as long as what is shown by the display 7 is related to the orientation of the image bearing surface of a sheet of recording medium.

Further, in either of the embodiments described above, the LED 9 was on the upstream side of the upstream edge 7b of the display 7 in terms of the light emission direction ID. These embodiments, however, are not intended to limit the present invention in scope. That is, the present invention is applicable also to an image reading apparatus structured so that the LED 9 is on the downstream side of the upstream edge 7b of the display 7.

The present invention can be realized by a process that supplies a system or an apparatus with programs which realize one or more functions in the embodiments described above, by way of a network or a storage medium, and reads and carries out the programs with the use of one or more processors of the computers of the system or apparatus. Further, it can be realized by a circuit (ASIC) which realizes one or more functions.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-215855 filed on Nov. 28, 2019, which is hereby incorporated by reference herein in its entirety.

What is claimed is:

1. A sheet feeding device comprising:
a casing having an outer casing surface;
a stacking tray configured to stack a sheet;
a sheet presence/absence detector configured to detect presence/absence of the sheet on said stacking tray;
a feeding portion configured to feed the sheet stacked on said stacking tray;
a light source accommodated in the casing and configured to emit light;
a display portion provided on the outer casing surface and configured to be illuminated by the light emitted from said light source;
a reflective surface provided so as to cross an optical axis of said light source and configured to reflect the light emitted by said light source, toward said display portion; and
a controller configured to control emission of the light of said light source on the basis of a signal outputted by said sheet presence/absence detector,
wherein said display portion is disposed at a position not crossing the optical axis.

2. A sheet feeding device according to claim 1, wherein said reflective surface comprises a first surface forming a first angle relative to the optical axis in a sectional plane including the optical axis and passing through said display portion, a second surface forming a second angle relative to the first surface, and a third surface connecting said first surface and said second surface with each other.

3. A sheet feeding device according to claim 2, wherein the optical axis crosses with the third surface.

4. A sheet feeding device according to claim 3, wherein a crossing point between the optical axis and said third surface is closer to the second surface than to the first surface.

5. A sheet feeding device according to claim 2, wherein said light source is disposed at a position upstream of an upstream end of said display portion with respect to a direction in which the light is emitted by said light source.

6. A sheet feeding device according to claim 2, wherein the first angle is not less than 0° and not more than 30°, and
wherein the second angle is not less than 60° and not more than 90°.

7. A sheet feeding device according to claim 2, wherein each of said first, second, and third surfaces is provided with pits and projections.

8. A sheet feeding device according to claim 1, wherein said light source is a bullet type LED.

9. A sheet feeding device according to claim 1, wherein said casing includes (a) a base portion supported so as to be rotatable about a first axis extending in a first direction, and (b) a cover portion supported by said base portion so as to be rotatable about a second axis extending in a second direction, wherein the second axis is parallel with the emission direction.

10. A sheet feeding device according to claim 9, wherein said cover portion defines an accommodation space configured to accommodate said light source,
wherein the accommodation space expands in a direction from an end of the first axis to the other end thereof, in a cross-sectional plane perpendicular to the second direction, and
wherein said light source is disposed at the end of the accommodation space.

11. A sheet feeding device according to claim 10, further comprising a substrate supporting said light source, and cable ties connected with said substrate, a connector provided at an end of the cable ties being connected to said substrate,
wherein said connector is disposed at the other end portion of the accommodation space.

12. A sheet feeding device according to claim 10, further comprising a substrate supporting said light source, cable ties connected with said substrate, and a holding member provided in said casing,
wherein said holding member is a single resin member including (a) a supporting portion supporting said substrate, and (b) a holding portion holding said cable ties and said reflective surface.

13. A sheet feeding device according to claim 9, wherein said display portion is disposed at a position of said cover portion which is an end opposite from the second axis in the first axis direction and which is central in the second axis direction.

14. A sheet feeding device according to claim 1, wherein said display portion has a display surface indicative of a direction of an image surface of the sheet stacked on said stacking tray.

15. A sheet feeding device according to claim 1, wherein said controller (a) causes said light source to emit the light when said sheet presence-absence detector detects the sheet, and (b) causes said light source not to emit the light when said sheet presence/absence detector does not detect the sheet.

16. An image reading apparatus comprising:
a sheet feeding device according to claim 1; and
a reading portion configured to read an image on the sheet.

* * * * *